United States Patent
Dollay (10) Patent No.: US 8,087,775 B2
(45) Date of Patent: Jan. 3, 2012

(54) HINGE ARRANGEMENT FOR SPECTACLES (76) Inventor: Lakh Dollay, Bexleyheath (GB)

( * ) Notice: Subject to any disclaimer, the term of this patent is extended or adjusted under 35 U.S.C. 154(b) by 0 days.

(21) Appl. No.: 12/452,254

(22) PCT Filed: Jun. 23, 2008

(86) PCT No.: PCT/GB2008/002131
§ 371 (c)(1),
(2), (4) Date: Apr. 20, 2010

(87) PCT Pub. No.: WO2008/155562
PCT Pub. Date: Dec. 24, 2008

(65) Prior Publication Data
US 2010/0208193 A1 Aug. 19, 2010

(30) Foreign Application Priority Data
Jun. 21, 2007 (GB) .................................. 0712036.3

(51) Int. Cl.
G02C 1/08 (2006.01)

(52) U.S. Cl. ............... 351/90; 351/95; 351/153; 16/228

(58) Field of Classification Search ..................... 351/41, 351/90–93, 95–97, 99–102, 140–142, 148–154; 16/228
See application file for complete search history.

(56) References Cited

U.S. PATENT DOCUMENTS

| 4,153,347 | A | | 5/1979 | Myer |
| 5,135,296 | A | * | 8/1992 | Lindberg et al. ............... 351/106 |
| 6,174,057 | B1 | * | 1/2001 | Lu ................................... 351/90 |

FOREIGN PATENT DOCUMENTS

| EP | 0922987 | 6/1999 |
| EP | 1146380 | 10/2001 |
| EP | 1326125 | 7/2003 |
| FR | 1008750 | 5/1952 |
| GB | 1590143 | 5/1981 |
| WO | WO 97/23803 | 7/1997 |
| WO | WO 2006/113950 | 11/2006 |
| WO | WO 2007/042633 | 4/2007 |

OTHER PUBLICATIONS

UK Search Report for Application No. GB 0811515.6, Aug. 27, 2008.

* cited by examiner

*Primary Examiner* — Huy K Mai
(74) *Attorney, Agent, or Firm* — Hueschen and Sage (57) ABSTRACT

A hinge arrangement is described in which a pair of temples (1) are connected to a frontal portion (10) of the frame by a connection of upper and lower jaws (15, 16) extending from the frontal portion and passing through one or two apertures (4) provided in the temple. The lenses, once fitted, urge the jaws against upper and lower surfaces (8, 9) of the aperture in the temple, for example against the ends a T-shaped slot, which helps to prevent the hinged connection from coming apart. The jaws also engage a portion of the temple located rearwardly of the aperture to provide frictional contact that improves the feeling of stiffness in the hinge and/or a biasing action resisting over-opening of the temples.

27 Claims, 10 Drawing Sheets

HINGE ARRANGEMENT FOR SPECTACLES

The present invention relates to a new hinge arrangement for spectacles, more particularly a spectacles frame having the new hinge arrangement, and also a new method of assembling spectacles.

Spectacles are an every day requirement. For many years people have arrived at different solutions for hinging a temple (the side arm of the spectacles) to a frontal portion of the frame (the front part of the frame which holds the lens). One early solution is described in U.S. Pat. No. 1,955,690, in which the upper and lower frame members that extend around the periphery of the lens to retain the lens in position, are formed into a small loop to create part of the hinge with the temple. The temple is provided with a hook to form the other part of the hinge and connect it to the frontal portion of the frame.

However, such early types of hinge arrangement could not hold the temples with any degree of firmness and this 'looseness' in the hinge is usually felt to be undesirable. Until recently standard hinges have been in use utilising a typical known "door hinge" type of mechanism, having a pin connecting two hinge halves, each of which is attached to the frame by rivets or screws. In some cases, the hinge parts are welded or integrally formed with the material of the front and sides of the frame. A screw is then used to join together the frontal portion and temple of the frame. Such frames tend to be sturdier and the hinge can be designed to provide a degree of spring bias as well. However, there are many parts to manufacture and go wrong. Most commonly the screw will work loose and may become lost.

In the last decade or so, many attempts have been made (and successfully) to introduce different ways of holding the lens and to develop different types of hinges.

U.S. Pat. No. 5,135,296 is an example of a pair of spectacles where the frame is made from wire, preferably a titanium wire. The use of modern materials such as resilient titanium wire has opened up new opportunities for the design of frames. In this reference, the wire of the frame extends around the upper periphery of the lens, down the outer side of the lens to form a hinge mechanism, and then continues under the lower edge of the lens and back up to a connection with the wire frame at the bridge to trap the lens in position and retain it there through a clamping force generated by the resilience of the wire. At the hinge, a further wire is engaged to form the hinged connection to a wire temple.

This known arrangement is one successful arrangement of many that allow the lens to be held in place and the hinge to be formed without the need for welding, soldering and screws.

Another arrangement is taught in U.S. Pat. No. 6,711,779 which shows a jaw hinged with a portion of the temple. The "jaw" is a member which extends from the frontal portion to form the hinged connection with the temple. In this arrangement, the wire jaw is provided with a hook at one end. The hook engages a column formed between two apertures in the temple to form a hinge. Friction between the jaw and the temple stiffens the hinge mechanism so that the spectacles are comfortable to wear. However a disadvantage with this spectacles frame is, because it is a rimless design, the jaw requires integral pegs or screws in order to secure it to the lens.

Arrangements for goggles are also known from U.S. Pat. No. 6,532,603 and U.S. Pat. No. 7,100,215 where the frame can be releasably connected to a buckle of an elasticated strap. The upper and lower frame members are urged together to trap a lens therebetween by the housing of the strap buckle. Such arrangements, however, provide no mechanism for hinging, nor is there any requirement to because of the elasticated strap.

It is desirable to simplify the hinge connection further and avoid the need to use screws or fasteners anywhere on the frame. One arrangement which achieves this is illustrated in EP-A-0922987. The spectacles frame is made entirely of wire. The frontal portion of the frame comprises upper and lower frame members which pass around upper and lower peripheries of a lens and are arranged to clamp a lens therebetween once a hinged connection has been made with a wire temple. The wire forming the temple is bent to provide an upper and lower loop of wire for the upper and lower jaws to engage and form a hinged connection with. The loops flex slightly to allow the jaws to be inserted.

A problem with such a wire frame arrangement is that the hinged connection to the temple can still feel rather loose and the hinging action of the temple is not biased or resisted in any way.

In addition, there is a move towards frames having more defined temples than the wire temples which have been fashionable recently. These more defined temples tend to have an elongate, substantially rectangular profile when viewed in cross-section, i.e., there is a height component (which might be 5 mm or more, more preferably 7 mm or more, and in many arrangements the height might be more than 10 mm at the hinge end of the temple). These broad temples can be manufactured, for example, from moulded plastics and in some cases metals, for example, titanium, steel, etc. may be used in whole or in part. The temples are usually solid, having material extending from an upper edge to a lower edge to define the elongate, substantially rectangular cross-section (often with curved sides or edges), though it is also envisaged that temples of a hollow construction could be used. In either case, the temple will have a thickness component extending from the side which faces the bridge and is worn next to the user's head (the inner side of the temple) to the opposite side which is the side that is seen when the spectacles are worn (the outer side of the temple). This thickness component is typically greater than 1 mm, and more preferably a few millimeters (e.g., 1.5 mm or more, up to possibly 4 or 5 mm). Such temples are heavier than their wire frame counterparts and the connection to the frontal portion needs to have a certain degree of rigidity in order to impart a feeling of quality.

Thus, according to the present invention there is provided a spectacles frame having a temple which is adapted to be hingedly connected to upper and lower jaws extending from a frontal portion of the frame, the frontal portion of the frame comprising upper and lower frame members which are arranged to extend from a bridge to the jaws around upper and lower peripheries of a lens for clamping a lens, once fitted, therebetween, wherein the jaws comprise a resilient member and extend from the frontal portion of the frame to engage with at least one, in order to create the hinged connection with the temple, the hinged connection being configured so that when a lens is fitted, the jaws are biased against opposed upper and lower surfaces of the at least one aperture and through this generate a clamping force which urges the upper and lower frame members against the lens for retaining the lens in the frontal portion of the frame. The hinged connection provides a hinge axis for the temple to hinge with respect to the frontal portion. The temple extends longitudinally with an elongate cross-section to define an inner side and an outer side of the temple, with the sides extending between upper and lower edges of the temple. Each jaw extends through the aperture (or one of the apertures) and engages the inner and/or outer side(s) of the temple beyond the aperture. According to one aspect this engagement generates a locus of contact with the inner and/or outer side(s) of the temple that extends substantially in a plane perpendicular to the hinge axis, in order to impart stiffness to the hinged connection. Preferably more than 50% of the locus of contact lies in a plane that extends perpendicular to the hinge axis, preferably more than 75%, more preferably greater than 95%, and most preferably the entire frictional contact of each jaw with a given side of the temple traces a locus that lies within a plane extending perpendicularly to the hinge axis.

In its broadest sense, the present invention provides a spectacles frame where a hinge connecting the temple to the frontal portion of the frame also generates a clamping force which urges upper and lower frame elements against a lens to retain the lens therebetween. It also provides rigidity to the hinge connection and may provide a biasing effect as the temples are opened, the example, it may resist over-opening.

The invention is possibly the simplest design that will allow the lens to be held in place and the hinge to be formed. By using the frontal portion in conjunction with the temple in this way, there is no welding, no soldering and no screws; just a very simple mechanism. Through the avoidance of soldering, welding or screws, the hinge mechanism is simpler to manufacture because of the fewer components and it is also likely to require less maintenance because of its underlying simplicity. The mechanism performs the dual function of tensioning the upper and lower frame members to clamp and thereby retain the lens firmly in the frontal portion of the frame, while also providing the hinge mechanism to allow the temple to close and open, preferably against a spring bias, so that the frame operates in a familiar way. The clamping force for the lens is generated as a reaction to the biasing of the jaws against the opposed upper and lower surfaces of the at least one aperture. The jaws are biased in this way as a result of the lens pushing apart the upper and lower frame members because the lens is sized to be slightly bigger than the frame it is to go into. Once the lens has been fitted, the jaws are prevented, by the spring bias, from moving back to a position where the hinge can come apart. In one embodiment the aperture extends through the temple in a thickness direction of the temple, in this way defining fixed upper and lower surfaces for the jaws to engage and urge against, the spacing of which is set during the manufacture of the temple, allowing tolerances to be precise.

In its simplest form, the hinge can consist of just the upper and lower jaws extending from the frontal portion to engage with an aperture in the temple, which is preferably in the form of a slot. The spectacles frame can consist of just the frontal portion with a temple connected on each side. There is no requirement for additional components to be provided to create the hinge mechanism or to retain the lens in the frontal portion.

The contact between the jaws and the inner and/or outer sides of the temple beyond the aperture provides significant improvements to the feeling of rigidity in the spectacles. The contact may be a line of frictional contact extending along the outer side of the temple where the end of a jaw rests against the temple side. When the end of the jaw is straight and it extends substantially perpendicularly to the hinge axis (such that the locus of contact between the jaw and the temple side would be a straight line), the entire contact may lie in a plane which extends substantially perpendicularly to the hinge axis. In other words, the end of the jaw would extend rearwardly along the temple towards the tip end in a roughly horizontal direction when the spectacles are worn. In one preferred embodiment, the upper and lower jaws are parallel and extend as parallel straight lines against the outer side of the temple, towards the tip end of the temple by at least a few millimeters. Preferably the ends of the jaws lie within channels or guides provided in the outer side of the temple. The engagement of the jaws within the three dimensional form of the channels or guides helps to maintain the jaws in place and impart greater stiffness to the hinged connection. In such embodiments, the entire locus of contact for both jaws might lie within two parallel planes that extend substantially at right angles to the hinge axis.

In other embodiments, the end of the jaws may be bent into a decorative or other shape. The locus of contact may have a major component extending in a plane perpendicular to the hinge axis but there may also be other frictional components extending in other directions providing torsional resistance, for example where the end of the jaw is bent into an ornamental shape or where the jaw includes a coiled region in contact with the outer side of the temple. Overall the average of the frictional components will tend to follow a plane extending substantially at right angles to the hinge axis.

In another embodiment, a line of frictional contact may extend around a curved surface, for example a part-cylindrical feature, provided on the outer side of the temple. Indeed, the line of frictional contact may continue through a further aperture in the temple and around a curved surface on the inner side of the temple. The locus of contact may take the form of a loop or partial loop lying in a plane substantially perpendicular to the hinge axis, and may include vector components extending from the hinge towards the tip end and vice versa, all within the plane which is substantially perpendicular to the hinge axis. In other embodiments, a line of frictional contact may extend around a curved surface provided on the inner side of the temple, and in preferred arrangements this line of contact may continue through a further aperture in the temple and around a curved surface on the outer side of the temple. The frictional contact may be enhanced through the ends of the jaws being formed as hooks which grip onto the curved surface or surfaces. Guides in the form of shallow channels or walled passages may be provided for the hook-like ends of the jaws. The edges of the guides may provide additional contact to improve the torsional rigidity of the hinged connection (e.g., against out of axis twisting).

In one embodiment, the locus of contact may be provided though the ends of the jaw contacting an insert provided on the outer side of a temple. In this embodiment, preferably the ends of the jaws are arranged to lie substantially in parallel planes which are perpendicular to the hinge axis. The insert may include a curved surface for the jaws to hook around which provides a fulcrum for the hinge. The insert may be provided with channels or guides to provide additional points of contact to the jaws which resist twisting of the hinge connection.

In another embodiment, the locus of contact for each jaw is provided by a circumferential line of frictional contact extending partially around a cylindrical member which is formed on the inner side of the temple. In this embodiment, the cylindrical member provides the fulcrum for the hinged connection and accordingly the hinge axis is coincident with the axis of the cylindrical member. Upper and lower webs supporting the cylindrical member, together with the inner side of the temple and the opposed surface of the cylindrical member, define the aperture. The upper and lower webs, in addition to providing the surfaces of the aperture for the jaws to urge against, also provide a line of contact in a plane which is perpendicular to the hinge axis and so help to impart a feeling of stiffness into the hinge mechanism. In an alternative embodiment two cylindrical members are provided of smaller height which are arranged to receive the jaws individually. Channels or guides may also be provided in these arrangements to provide three dimensional form as well as frictional contact to impart additional rigidity.

The simplified frame arrangement can also be glazed easily by an optical technician. One way is for the frame to be assembled first by connecting the temple to the frontal portion of the frame. This can be done by moving the resilient members which form the jaws into a configuration (usually by squeezing them together) where they can be fed into the aperture or apertures in the temple. Once this simple connection has been made, the resilient members can be displaced or allowed to spring back into a configuration where they can urge against the opposed upper and lower surfaces of the aperture. In the simplest form, this may be the top and bottom ends of a slot that the prong-like members of the jaws have been inserted into. The size of the lens opening is slightly smaller than the lens it needs to accommodate, so that the upper and lower frame members are pushed slightly apart by the height of the lens. A gap might be visible, for example, where the upper and lower frame members converge near the hinge when the lens is fitted. Since the jaws extend from the upper and lower frame members, this outward displacement also displaces the jaws to urge them into a biased engagement against the upper and lower surfaces of the aperture. The resilience of the jaws and the biasing action against the upper and lower surfaces, is levered through the jaws to the upper and lower frame members, squeezing them together and generating the spring-like reaction force in the frame, which then clamps and retains the lens in the frontal portion of the frame. The clamping force is dependent on the resilience of the jaws and the extent to which they are biased against the sides of the aperture by the outward displacement of the frame members in order to accommodate the lens. The optical technician forces the upper and lower frame members apart, against the biasing action of the jaws, to a point where the lens can be fitted. The lens is then held in place by the clamping force created by the jaws being urged against the opposed surfaces of the at least one aperture.

With this hinge arrangement, it may also be possible for the optical technician to glaze the spectacles in another way. First the frame can be separated if it is supplied in a ready assembled configuration. Then the lens can be offered up to the upper and lower frame members. The upper and lower frame members are forced apart, the lens fitted and then the frame members released to spring back and trap the lens in position. In some arrangements, the upper and lower frame members may actually separate from one another to facilitate the fitting of the lens. With the lens in position, the jaws are forced against their inherent resilience, into a configuration where they can be inserted into the at least one aperture, and are then released so that they spring back against the upper and lower surfaces of the aperture. The configuration of the hinge connection should be such, that with the lens in position, the jaws are urged into a biased engagement with the upper and lower surfaces. This generates the clamping force which retains the lens firmly in position between the upper and lower frame members.

Preferably the temple is provided with just a single aperture. This aperture can be in many forms and is preferably elongate in the height direction of the temple (i.e., in the direction of the hinge axis). Thus the aperture may be a slot where top and bottom surfaces form the upper and lower surfaces of the at least one aperture. The recent trend for more well defined temples than the wire versions of late can allow plenty of room for quite a large slot if desired. The aperture may have a wider middle portion, for facilitating insertion of the jaws, and narrower upper and lower end portions that limit the amount of play on the hinge once the lens has been fitted and the jaws are urged against these surfaces. Thus the aperture may have a top-hat like profile (with the hat being viewed on its side when the spectacles are being worn) where the upper and lower extensions of the slot are seen to form the brim of the hat. Curved surfaces or recesses may be provided where the jaws rest in order to facilitate a smooth hinging motion. The jaws may extend rearwardly beyond the perimeter of the aperture, along the outer side of the temple to exert a biasing effect which resists opening the temple too far. It also assists the feeling of rigidity in the hinged connection which adds a feeling of quality to the spectacles frame.

The wider middle portion of the slot may have a rectangular shape, a triangular shape, a diamond shape or other geometric shape, a curved shape e.g., a circular, semi-circular, oval or other organic shape, a trade mark or logo, etc. Its purpose is to facilitate the insertion of the pair of jaws into the hinged connection but the appearance of the slot can be varied to enhance the design and appeal of the spectacles. Accordingly this wider middle portion need not be located exactly in the middle of the slot, but may be positioned closer to one or other of the ends.

The aperture is preferably located within 15 mm of the front edge of the temple, more preferably within 10 mm, and more preferably still within about 5 mm. In other words it is located sufficiently close to the front end of the temple so that a good, reliable clamping force can be generated on the lens through the biasing action of the jaws. However, the temple needs to be strong enough to be able to resist the biasing from the jaws without breaking. This balance of considerations may have an effect on the location of the aperture, but the actual position and shape of the aperture will probably depend on the overall design of the frames and the effect the new hinge arrangement has on the appearance. From a design point of view, it is usually desirable for the front end of the temple to be flush with the frontal portion. In another it may curve around and overlap the frontal portion. It may be preferred for the jaws to fit within a recess in the front end of the temple so that the jaws are visible to the observer where they engage the temple. In another arrangement the jaws protrude through the aperture and are visible on the outer side of the temple. In another, the jaws are recessed into the outer side of the temple so as to be flush with the temple. In another they are partially or fully hidden from view to the observer.

If preferred, two apertures may be provided, one for each of the upper and lower jaws. Preferably these apertures are arranged one above the other on the temple. The apertures may be any shape so long as they function to facilitate the insertion of the jaws and provide upper and lower surfaces for biasing against. They also need to facilitate the hinging operation. Thus, the profiles can be similar to those for the single aperture arrangements, with a region of the temple separating the two apertures. Preferably the upper jaw extends from the upper frame member to form an upper part of the hinge connection, and likewise the lower jaw extends from the lower frame member to form a lower part of the hinge connection. In this way the jaws may extend in a roughly or substantially parallel configuration from the frontal portion to the hinge. The lens will therefore force the jaws apart and generate the lens clamping force through biasing the jaws outwardly against the opposed surfaces of the two apertures in the temple.

It is also envisaged that the upper and lower jaws may cross over between the frontal portion and the hinge. In this way, the hinge ends of the jaws are pulled together by the insertion of the lens, rather than being forced apart. The jaw extending from the upper frame member may act on the lower of the two opposed surfaces, and the jaw extending from the lower frame member may act on the upper surface of the aperture(s), so that the outward displacement of the frame members draws the hinge ends of the jaws together, squeezing the material of the temple therebetween.

Preferably the at least one aperture is bounded on all sides by the material of the temple i.e., the perimeter defining the aperture is wholly within the material of the temple. An example of this might be a slot which has been moulded or cut into the temple. The at least one aperture may alternatively extend to an outer edge of the temple (e.g., the front, outer, upper or lower edges) so that the aperture is open for a portion of its perimeter. The aperture is preferably in the form of an elongate slot, but may have a more complicated profile, for example, in the form of a spiral or track. The important point is that the upper and lower opposed surfaces are positioned on the temple at points where, through biasing engagement of the jaws, the upper and lower frame members are urged against the upper and lower peripheries of the lens, to clamp the lens firmly in position.

Preferably each jaw is made of a resilient member, preferably a resilient wire, such as titanium wire. For example the wire may be of a suitable nickel-titanium alloy having sufficient β-phase for shape memory retention. New plastics materials are being developed which may have sufficient resilience and strength as well as shape memory to perform the function of the jaw. Preferably both of the jaws on a given side of the frontal portion are made of the same material and are of the same gauge so that they have equal biasing effect. However, it is also possible to have the jaws made of different materials and/or sections, so that they have different inherent resilience. In one arrangement, one of the jaws may be comparatively stiff, with the overall resilience in the jaws being provided by predominantly one jaw. This may allow different materials to be used for the jaws, for example to reduce costs or as a design feature, though such an arrangement might be less desirable from the consideration of quality and longevity of the spectacles.

Preferably the jaws are integral extensions of the frame members, i.e., that the upper frame member extends, for example as a single wire, to form the upper jaw and/or the lower frame member extends, for example in a similar way, as a single wire, to form the lower jaw. The jaws may have a circular, oval or even strip like cross section. The jaws preferably project as prongs, outwardly and rearwardly from the frontal portion. The jaws, if desired, may be continuous with one another and formed as a loop after the hinge connection, though in most of the embodiments envisaged, the upper and lower jaws will extend from the frontal portion to a distal end located at the hinge. Thus, the spectacles frame may consist of simply a frontal portion (providing the jaws) and a pair of temples, i.e. just three components that need to be manufactured.

Although it is preferred for the jaws to be integral extensions of the frame members, if desired, one or other of the upper and lower jaws can be manufactured as a separate component and attached to the respective upper or lower frame member, for example, by welding, soldering, adhesive or fastener. In this embodiment, the force from biasing the jaws against the opposed upper and lower surfaces of the at least one aperture, is transmitted via the jaw/frame member connection to the respective upper and lower frame members, in order to generate the clamping force that retains the lens in the frontal portion of the frame.

The jaws preferably include a bend or a stop to limit the temple, so that it only opens up to the point of being substantially perpendicular to the plane of the frontal portion. The temple may instead be provided with a surface that engages another part of the frame to limit hinging movement. With modern materials, the bridge and the jaws are often quite flexible, allowing the temple to be opened wider through bending of the frame without damage to the spectacles. The jaws may also include a coiled section to provide suitable torsional spring force on the temple.

The upper and lower frame members may be permanently connected together at the bridge in any conventional manner (e.g., welding, soldering, adhesive, fastener, integrally formed etc.) or they may be one piece to start with. In other arrangements, it may be desirable for the upper and lower frame members to be separable, for example to facilitate glazing. The connection at the bridge may be a mechanical connection, for example the lower frame member hooking over a portion of the upper frame member. In another arrangement, the upper and lower frame members may be pivotable with respect to the other but may not be detachable.

In an arrangement where the upper and lower frame members are detachable, the at least one aperture may be smaller, for example a circular through-hole corresponding substantially to the diameter of the jaw, as it may be possible to feed the twisted profile of the jaw through the aperture and then connect the lower frame member to the upper frame member. Once the lens is inserted, the jaw will be biased against a surface of the aperture, in the same manner as in the previous embodiments, in order to generate the clamping force which is transmitted to the lens periphery by the upper and lower frame members. In this embodiment, preferably there are two spaced apertures for the pair of jaws, though conceivably they could share just one aperture.

Preferably the temple is the same construction from the area of the hinge (i.e., the front of the temple) all the way back to the tip end (i.e., behind the ear in use). In other words, it is one piece. The temple has an upper edge and a lower edge extending from the hinge end to the tip end, joined by inner and outer sides that define a body with a substantially elongate profile in cross-section. It has a height component extending between the upper and lower edges and a thickness component extending between the inner and outer sides, its elongate profile meaning that the height is greater than the thickness. The heights and thicknesses may be conventional and correspond with those mentioned previously. Preferably the temple is a moulded plastics component although other materials and methods of manufacture are envisaged.

In one embodiment the portion of the temple having the hinge is of a different construction to the tip end, for example a moulded plastics component at the front end where the hinge is located and a wire portion, which may include a soft sleeve material covering the wire, at the tip end. The moulded front section may only extend a short way beyond the hinge, e.g., around 10% of the length of the temple, more preferably more than 30% of the length of the temple, or may extend halfway or more of the length of the temple.

In a further development of the invention, the upper and/or lower jaws are provided with retaining means for retaining the temple in its hinged configuration. This may be in the form of a hook formed at the end of the jaw. The hook can then be located around a curved profile on the temple, for example, a cylindrical formation, which preferably extends in the axial direction of the hinge, acts as a fulcrum for the hinging movement, with the hooks griping the curved profile to prevent the temple from sliding along the jaws and to provide a degree of stiffness to the hinging movement. A recess or further hole may be present in the temple to accommodate the movement of the end of the jaws during the hinging movement. Tracks may be provided to guide the jaws during hinging. The ends of the hooks may act on the outer side of the temple to resist over-opening.

In these embodiments the jaws would still be biased against opposed upper and lower surfaces of the at least one aperture in order to generate the clamping force for retaining the lens firmly in position within the frontal portion of the frame. The at least one aperture may take the form of a recess rather than a hole extending all the way through the temple. In one embodiment, the jaws extend as hooks that fit within recesses and which track around the front edge of the temple, preferably to a location where a hole extends through the temple. The sides of the recesses provide the opposed upper and lower surfaces for the jaws to act against. Biasing may also be exerted against the sides of a hole which the hooks feed through. Preferably the hooks grip a curved profile of the temple to retain the temple with respect to the jaws and to improve the hinging action of the spectacles. Preferably the curved profile includes a recess extending in the longitudinal direction of the temple to guide the hook end of the jaw as it slides around the curved profile. This also helps to lock the jaws in position against the opposed upper and lower surfaces. In another embodiment an insert provides the curved profile for the hooks to grip onto and the tracks for guiding the hooks. The insert can be formed from a different material to that of the temple for improving wear resistance. For example, it may be formed of metal and the temple moulded from plastics to improve the wear resistance.

In most circumstances, the frame will require specialist equipment, such as a pair of fine pliers, in order to make adjustments and fit the lenses so these actions would normally only be made by a trained optical technician. However, this may not be so in all cases and it is envisaged that the present invention extends to a kit of parts, for example, comprising a frontal portion and at least two temples which are adapted to be hingedly connected together in the way described above. The kit may also contain addition frontal portions and/or pairs of temples, which can be assembled to form spectacles of the user's choice. Additional lenses may be provided, for example, of different colours or tints which can be fitted within the frame as desired by the user.

The present invention also extends to glazed spectacles, for example, a frontal portion that is hingedly connected to two temples in the manner described above to form the spectacles frame, wherein the spectacles include a pair of lenses (which may be of plastics or glass, and may be corrective or not as the case may be) which are retained within the upper and lower frame members to prevent the hinge connections with the temples from separating.

Certain preferred embodiments of the present invention will now be described in greater detail by way of example only and with reference to the accompanying figures, in which.

This spectacles hinge design is a solder, weld and screw free method of attaching a temple to the frontal portion of the frame. In doing so, a unique hinge is formed and the lens is held in place under tension at the same time.

This hinge and combined lens holding arrangement can be applied to most materials with modification, but the principle in this hinge is essentially the use of an aperture or apertures, typically in the form of a slot or slots, which can be of varying size and/or shape, in combination with the frontal portion of the frame. Jaws extending from the frontal portion project through such slots and then when the lens is fitted, tension in the frame is generated, holding the lens in place whilst also creating the hinge.

An important feature of this invention is that the temple is provided with at least one aperture, preferably in the form of a slot through which are introduced the jaws, preferably in the form of metallic prongs. A wider part of the slot allows the prongs to be inserted, then the thin prongs are displaced into the thin, preferably vertical parts of the slot, where at the final point the prongs can no longer continue to move. At this point the lens is introduced to create tension which holds the prongs in position and prevents them from moving back to the wider part of the slot, thereby preventing the hinge from coming apart. The lens itself is then held in position by the tension created through the prongs being urged against the ends of the slot.

A means may also be required to keep the temples from "flopping" or moving along the horizontal portion of the prong. This could be in the form of a stop, but in other embodiments, titanium prongs are curled around at the end to form a hook. The prongs will then fit neatly around a cylindrical element provided on the temple, for example as a moulded bump. There may also be a recess or groove in the cylindrical element where the curled prongs will lie and then grip. The reason for the recess in the cylinder is to keep the prong on a horizontal axis at all times, helping stability and the shape of the frame. The cylindrical element then creates a fulcrum for the temple to rotate around.

An ideal metal for the frontal portion of the frame is titanium as it has good elastic properties, allowing the hook at the end of the prongs to expand to fit and grip around the cylinder. This helps create a small amount of friction to stiffen up the hinge and give a quality feel to the spectacles. Other plastics materials are now available which have good elastic properties and good shape memory retention, and could be used as an alternative.

The temple portion where the slot and cylinder are located can be made from a separate part and then implanted into the material of the side. Preferably this is made from titanium (e.g., a titanium alloy) or similar material with good wear characteristics. In this way the insert provides a surface for the ends of the jaws to slide over which can be made more resistant to wear.

In another embodiment the jaws (prongs) of the frontal portion may be a separate component which is attached to the material of the frontal portion, enabling the frontal portion to be made of any of a variety of materials, so as to allow limitless designs.

Figure 1:
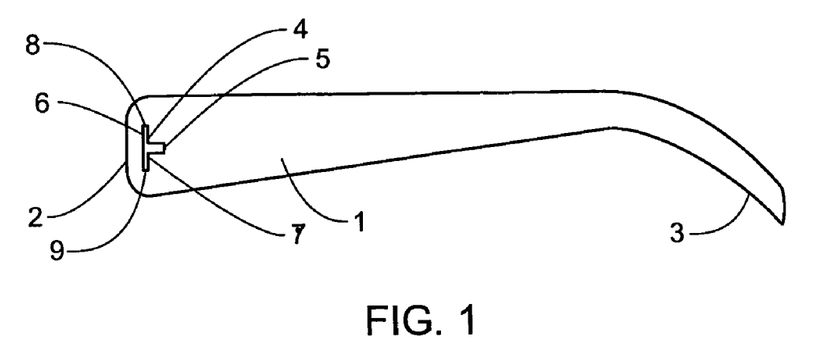
FIG. 1 shows a side elevation of a first embodiment of a moulded temple.

Turning now to the figures, FIG. 1 illustrates a temple 1 for a spectacles frame. The temple 1 has a front end 2 for attaching to the frontal portion of the frame, and a tip end 3 for locating over the user's ear. The temple 1 is of substantially rectangular profile when viewed in vertical cross-section, with upper and lower edges converging rearwardly from the front end 2 to the lip end 3. The broader inner and outer sides are preferably planar and extend vertically but may be profiled. The temple 1 is provided with an aperture 4 at the front end 2. In the illustrated embodiment, the aperture 4 is a T-shaped slot. The stem of the "T" forms the wider middle portion 5 of the slot 4, and the top of the "T" provides the thinner end portions which extend to the opposed upper and lower end surfaces (8, 9) for the jaws of the frontal portion to act upon as will be described in more detail below.

Figure 2:
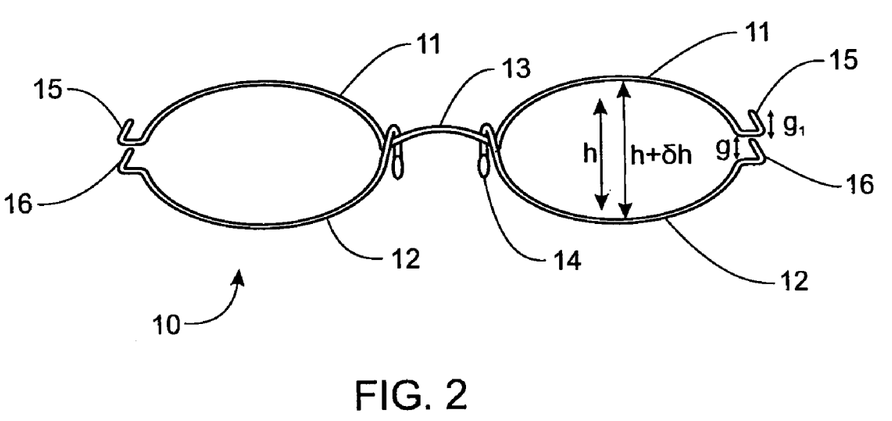
FIG. 2 shows a front elevation of a first embodiment of the frontal portion of the spectacles frame.

FIG. 2 shows a front elevation of the frontal portion 10. In the embodiment illustrated, the frontal portion 10 is made of three wires; a first wire forming the upper frame members 11, and the second and third wires forming the lower frame members 12. The upper and lower frame members 11, 12 are connected at the bridge 13 and are arranged to extend around the upper and lower peripheries of a lens once it is fitted. The lower frame member 12 is arranged to hook over the upper frame member 11 at the bridge in order to form a mechanical connection. The lower frame member 12 may extend at the bridge as shown to provide seats for pads 14 for supporting the spectacles on the user. At the hinge side of the frontal portion 10, the upper and lower frame members 11, 12 extend as prong like members to form the upper and lower jaws 15, 16. As shown, the upper and lower jaws 15 may project first outwardly and then rearwardly, in a substantially parallel configuration.

The upper and lower frame members 11, 12 are designed to accept a particular size of lens. Thus, the upper and lower frame members 11, 12 define an opening with a height h for a lens that is of height h+δh, prising apart the frame members 11, 12 and creating a gap at the hinge end which is of a height g. This in turn leads to a natural separation of the jaws at the hinge end which is equal to $g_1$.

Figure 3:
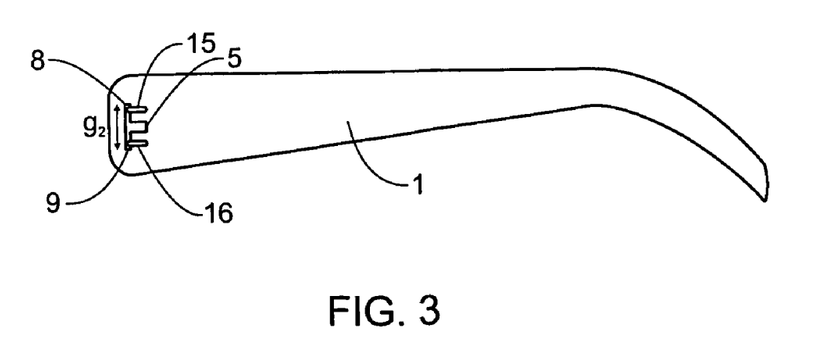
FIG. 3 shows a side elevation of the temple of FIG. 1 with the frontal portion of FIG. 2 connected.

In FIG. 3, the frontal portion 10 is shown already hingedly connected to the temple 1. To connect the frame, the upper and lower jaws 15, 16 are moved together so that they may be inserted through the middle wider portion 5 of the slot 4. With the jaws 15, 16 protruding through the slot 4, the upper and lower jaws may be displaced outwardly to the ends of the "T", i.e., to the upper and lower surfaces 8, 9 respectively, for fitting the lens. In some arrangements where the upper frame member 11 is permanently connected to the lower frame member 12, the inherent resilience in the frame may naturally tend to bias the upper and lower jaws 15, 16 against these surfaces 8, 9.

The height of the slot, $g_2$, is configured to be less than $g_1$, which is the natural separation of the jaws 15, 16 once the lens of height h+δh has been inserted. In this way, the lens through outwardly displacing the upper and lower frame members 11, 12, will cause the upper jaw 15 to be urged into biased engagement with the upper surface 8 of the slot 4 and the lower jaw 16 into biased engagement with the opposed lower surface 9. Thus the outward separation of the upper and lower frame members 11, 12 is resisted by the jaws 15, 16 being forced against the ends of the slot 4, in this way working against the spring force created by the resilience in the jaws 15, 16 and possibly also the frontal portion 10. The jaws 15, 16 therefore act as springs which are being levered against these opposed surfaces 8, 9 by the upper and lower frame members 11, 12. This creates tension in the frame and a reaction force that pushes together the upper and lower frame members 11, 12, urging them against the upper and lower peripheries of the lens in order to firmly clamp the lens in position. The lens also prevents the jaws 15, 16 from moving back to the middle wider portion 5 of the slot 4, thereby preventing the temple 1 and frontal portion 10 from separating. The height of the slot may be greater than 3 mm, more preferably greater than 4 mm, and most preferably greater than 5 mm. In one example where the temple height was over 15 mm at the hinge end, a slot length of 5.6 mm was provided for jaws of 0.9 mm diameter.

The lens may be of any form, assuming it is shaped appropriately to fit within the frame. For example, it may be corrective for the user's sight condition, it may be coloured or tinted to provide sunglasses either as a corrective lens or not, it may be a protective lens, it may be bifocal etc., etc.

The axis of the hinged connection between the frontal portion 10 and the temple 1 extends in FIG. 3 between the upper and lower surfaces 8, 9 of the slot 4 in a substantially vertical direction. The jaws 15, 16 project through the slot 4 and then follow along the outer side of the temple 1 as two parallel elements which extend at right angles to the hinge axis. The jaws 15, 16 are in frictional contact with the outer side of the temple 1. The jaws 15, 16, each generate a locus of contact with the temple 1 in the form of a straight line that extends within a plane which is substantially perpendicular to the hinge axis. In one embodiment, the jaws 15, 16 extend for more than 3 mm in contact with the outer side of the temple 1, more preferably more than 4 mm, and most preferably more than 5 mm. The jaws are preferably made of wires which are 1 mm in diameter or less.

The T-shaped slot 4 may include additional recesses to guide the hinging of the temple 1 and to locate it more firmly with respect of the frontal portion 10. These might be in the form of shallow channels (not shown) corresponding to the upper and lower jaws 15, 16. In one embodiment, the slot 4 and the two channels for the upper and lower jaws 15, 16 define an "E"-shape. The end portions of the upper and lower jaws 15, 16 can also act on the outer surface of the temple 1 in order to bias the hinge connection and resist the hinge being opened to greater than 90°. Additional stops or surfaces may be provided to prevent the further opening.

Figure 4:
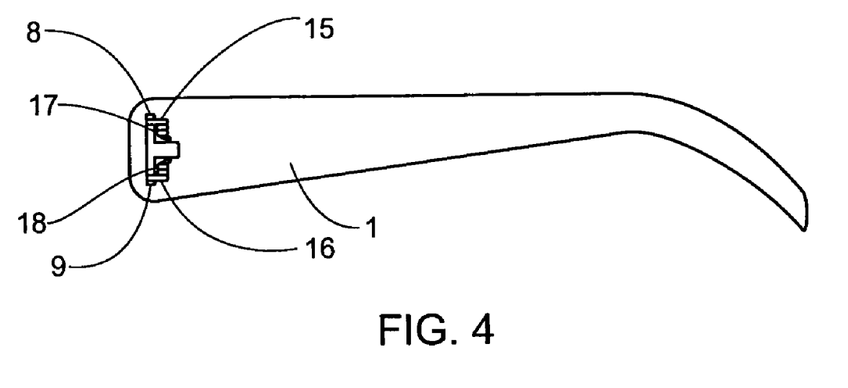
FIG. 4 shows another embodiment where the jaws include a coil spring section.

In the arrangement shown in FIG. 4, the upper and lower jaws 15, 16 are provided with a coil spring section 17, 18 in order to improve the torsional biasing of the temple 1 towards the frontal portion 10.

Figure 5:
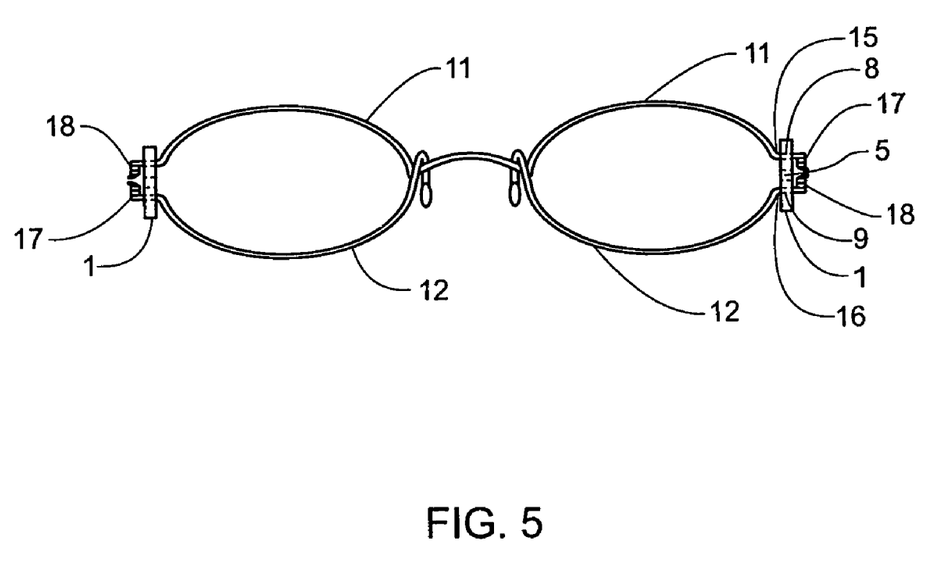
FIG. 5 shows a front elevation of the spectacles frame shown in FIG. 4.

FIG. 5 shows a front elevation of the embodiment shown in FIG. 4. The spring coil sections 17, 18 of the upper and lower jaws 15, 16 can be seen resting on the sides of the temple 1.

Figure 6:
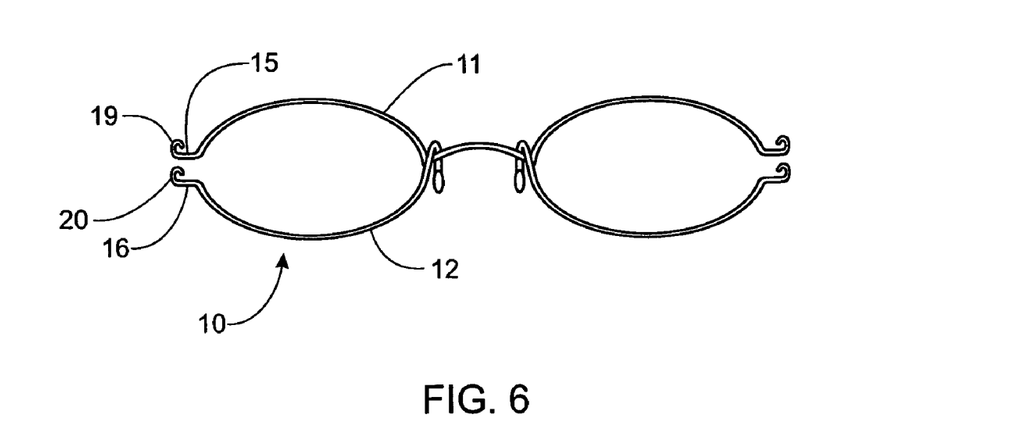
FIG. 6 shows a front elevation of a further embodiment having jaws formed with hook sections.

In order to prevent the temple 1 in FIG. 5 from sliding inwardly, and also to provide a point of connection for the coil spring portions 17, 18 to act against, a kink or stop (not shown) may be required. As an alternative, the ends of the jaws 15, 16 may be provided with means, for example in the form of a hook as shown in FIG. 6, to keep the temples 1 positioned correctly on the jaws 15, 16.

Figure 7:
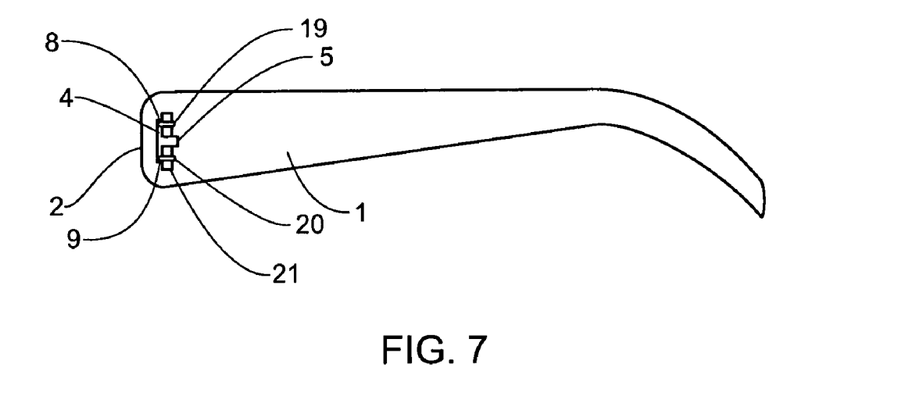
FIG. 7 shows a side elevation of a temple with the frontal portion of FIG. 6 connected.

In FIG. 7, the hooks 19, 20 of the upper and lower jaws 15, 16 can be seen protruding through the slot 4 to engage an enlarged region, for example, a semi-cylindrical formation or barrel-shaped region 21 on the temple 1 which the hooks 19, 20 of the jaws 15, 16 can hook around and grip.

Figure 8:
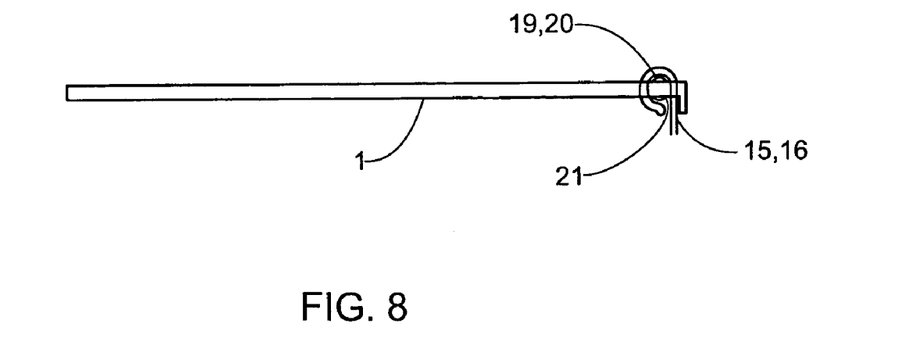
FIG. 8 shows a view from above of a temple engaging with the hook sections of a pair of jaws.

If desired, as shown in FIG. 8, the hooks 19, 20 may protrude back through additional apertures to the inside of the temple 1. In the embodiment illustrated, the barrel shaped region 21 is formed as a cylinder 21 with curved portions being provided on each side of the temple 1.

Figure 9A:
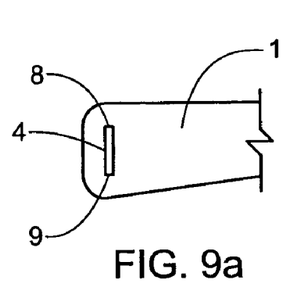
FIGS. 9(a) to 9(p) illustrate examples of possible aperture shapes.
Figure 9B:
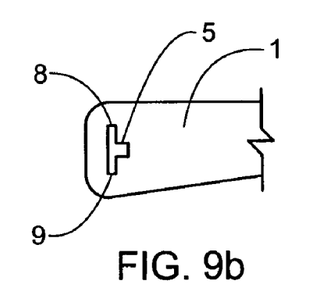
Figure 9C:
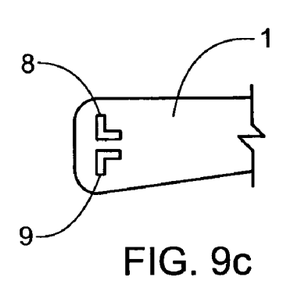
Figure 9D:
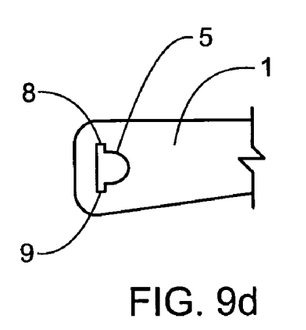
Figure 9E:
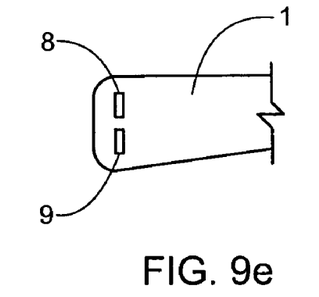
Figure 9F:
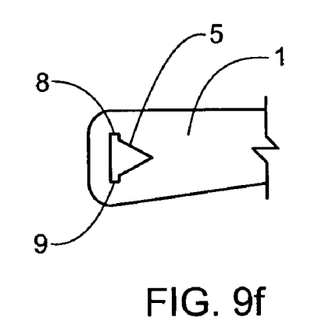
Figure 9G:
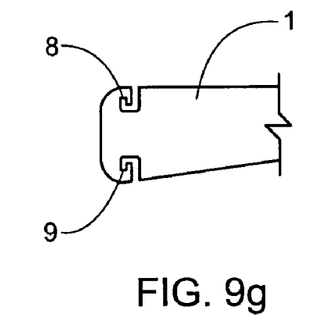
Figure 9H:
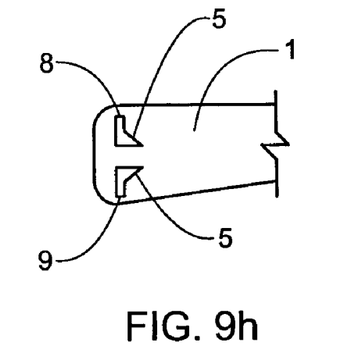
Figure 9I:
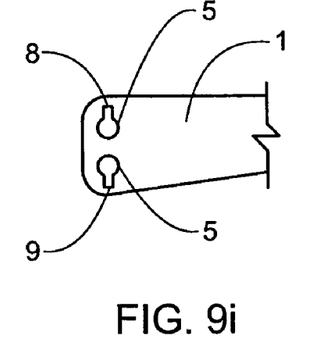
Figure 9J:
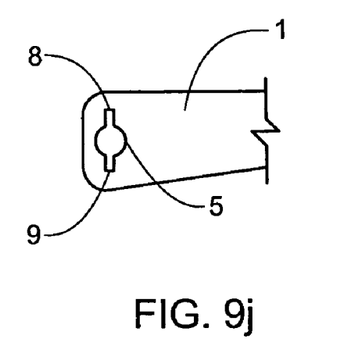
Figure 9K:
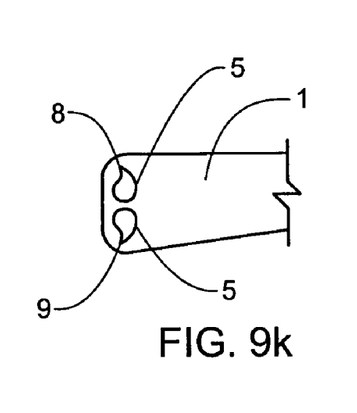
Figure 9L:
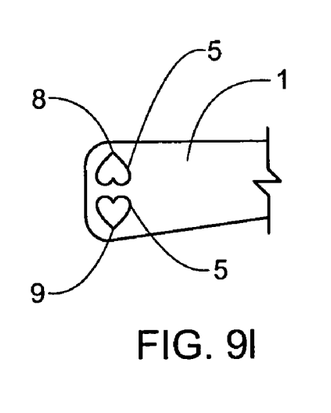
Figure 9M:
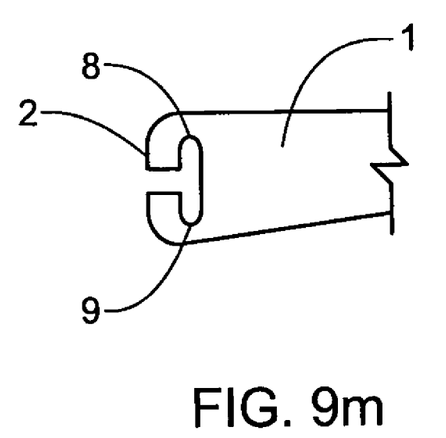
Figure 9N:
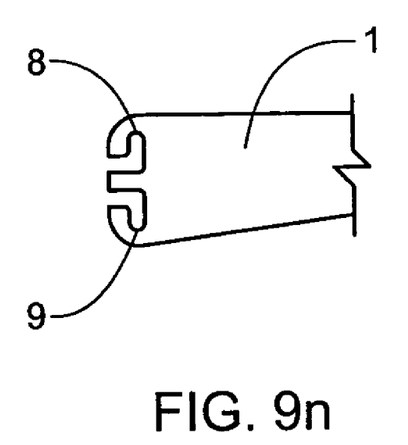
Figure 9O:
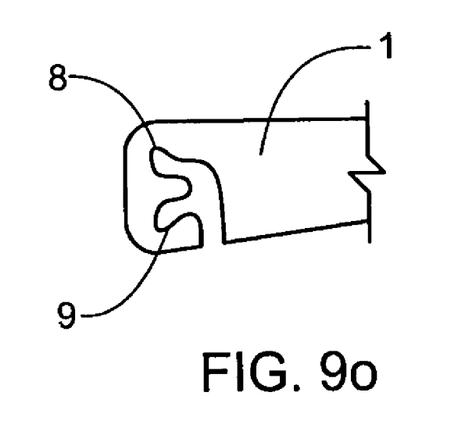
Figure 9P:
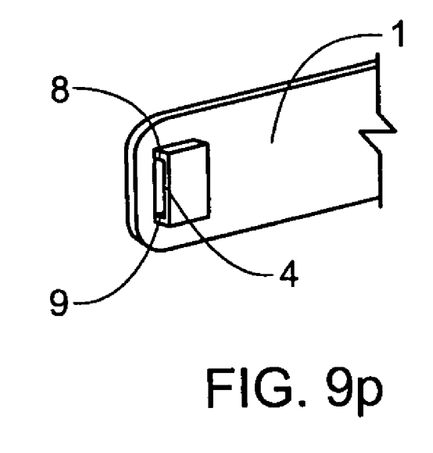

FIGS. 9(a) to 9(p) show a variety of different possibilities for the slot shapes. In FIG. 9(a) the slot 4 has an elongate rectangular profile. In FIG. 9(b) the slot has a T-shape. If desired, the T-shape (or any of the other shapes mentioned below) could be reversed with the stem extending towards the front end 2 of the temple 1 rather than away, although this may position the hinge slightly further down the temple 1. FIG. 9(c) shows two L-shaped apertures. FIG. 9(d) shows a slot 4 having a D-shaped wider middle portion 5. FIG. 9(e) shows two slots. FIG. 9(f) shows a slot with a triangular wider middle section 5. FIG. 9(g) shows two slots in the form of a spiral track. FIG. 9(h) shows two apertures with a triangular wider portion 5. FIG. 9(i) shows two apertures with a circular wider portion 5. FIG. 9(j) shows a single slot with a circular wider portion 5. FIGS. 9(k) and 9(l) show two apertures having tear-drop or heart shape profiles, the shape incorporating a wider portion 5. Other stylised shapes are possible which may add to the appeal of the frames, for example, geometrical shapes, stylised shapes, trade marks, logos, numbers, letters, etc. FIG. 9(m) shows an arrangement with a slot where the jaws 15,16 are introduced via an opening in the front end 2 of the temple 1. FIG. 9(n) shows a variation having two slots 4. The shape of the apertures 4 could include any of the features described above. FIG. 9(o) shows a slot 4 where the jaws 15,16 are introduced via an opening in the lower edge of the temple 1. Similarly an arrangement is envisaged where the opening is provided in the upper edge of the temple. Again the shape of the aperture(s) may include any of the design features mentioned above. FIG. 9(p) shows a temple having an aperture 4 formed in a projection or lug extending from the inside of the temple 1.

Figure 10:
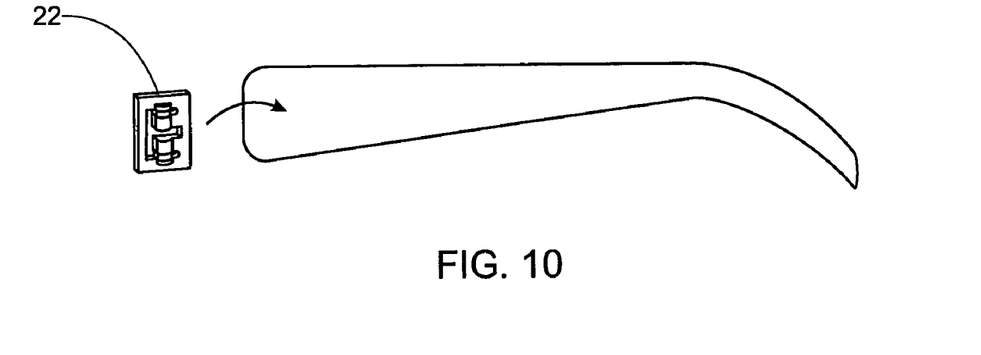
FIG. 10 shows a side elevation of a temple having an insert provided thereon for receiving the jaws of the frontal portion.

FIG. 10 illustrates an embodiment which is similar to that of FIG. 7. In this arrangement, the temple 1 is provided with an insert 22 which the jaws 15, 16 engage against. In this way, the material of the insert 22 can be chosen to improve wear resistance. For example, it may be a titanium based or other metallic or ceramic material. Circumferential recesses 23, 24 may be provided on a barrel section 21 to guide and locate the ends of the jaws 15, 16.

Figure 11:
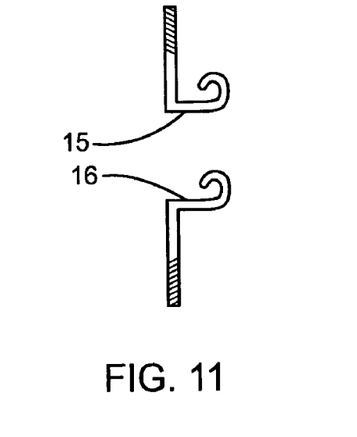
FIG. 11 illustrates a pair of jaws which are formed separately from the frontal portion and attached subsequently.

FIG. 11 illustrates two jaws 15, 16 which can be manufactured separately and then joined to the upper and lower frame members 11, 12 in order to form the frontal portion of the frame 10. Such an arrangement might be preferred where different materials are required, for example, where a thicker, perhaps moulded plastics upper frame member 11 is required as part of the design of the spectacles.

Figure 12:
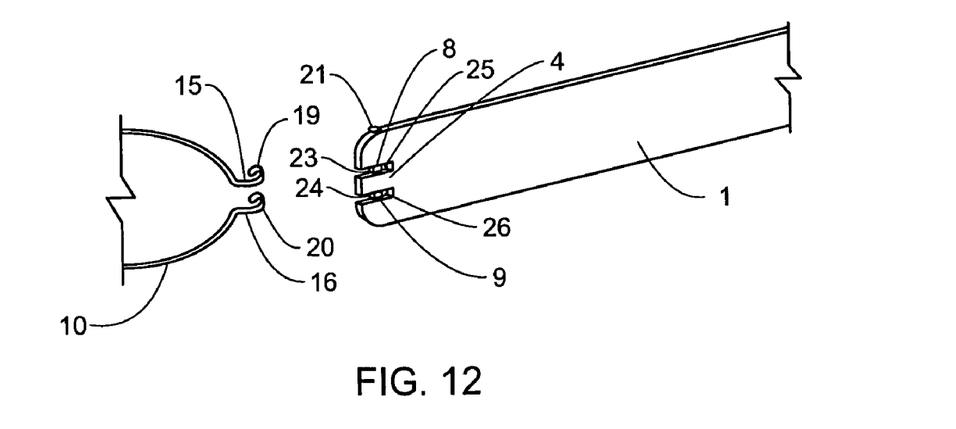
FIG. 12 illustrates an embodiment where the jaws extend around the front end of the temple, within a recess so as to lie flush with the outer surface of the temple.

FIG. 12 illustrates an embodiment where the jaws 15, 16 extend around the front end 2 of the temple 1 to hook onto the temple 1. In the arrangement shown, the jaws 15, 16 are housed within recesses 25, 26 which provide the opposed upper and lower surfaces 8, 9 to generate the clamping force that retains the lens firmly in position. In addition, further apertures 27, 28 are provided for the ends of the hooks to engage and provide further opposed surfaces to generate the biasing action. A semi-cylindrical formation is provided on the inside surface of the temple 1 for guiding the hooks 19, 20 during hinging. Thus in this arrangement the hooks are providing three functions: allowing the temple to hinge, generating the lens clamping force, and retaining the temple in position with respect to the frontal portion. The hooks may also provide a degree of friction which adds to the quality feel of the spectacles.

Figure 13:
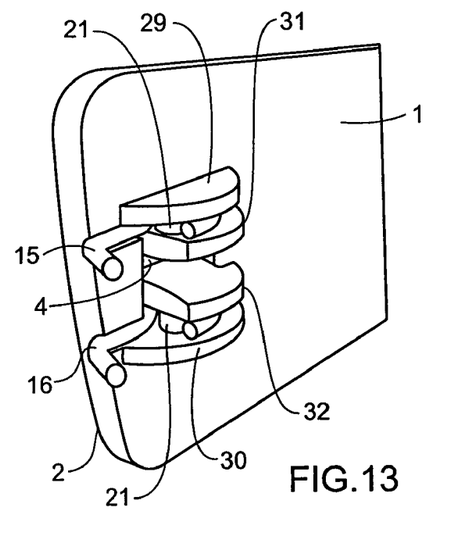
FIG. 13 illustrates an enlargement of a hinged connection of a further preferred embodiment as a perspective view looking at the inner side of a temple.
Figure 14:
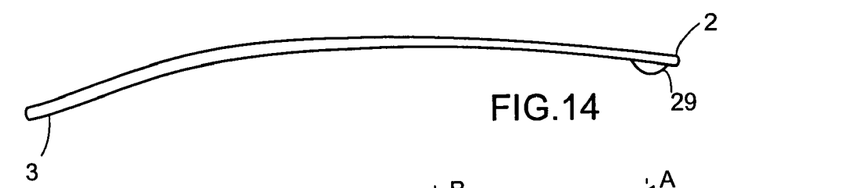
FIG. 14 shows a complete temple having the features for the hinged connection of FIG. 13 as a plan view.
Figure 15:
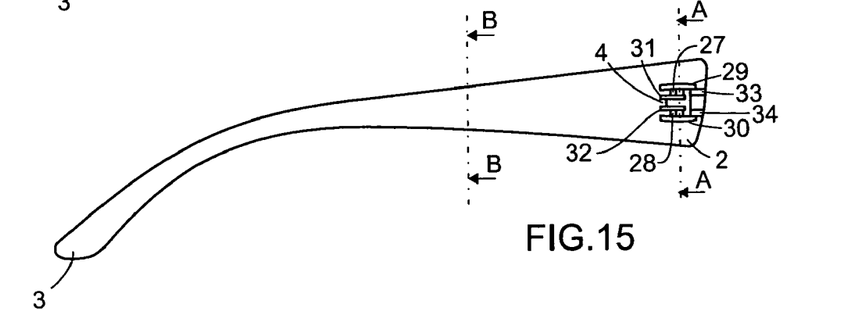
FIG. 15 illustrates the complete temple of FIG. 13 as a side elevation, showing the inner side of the temple.
Figure 16:
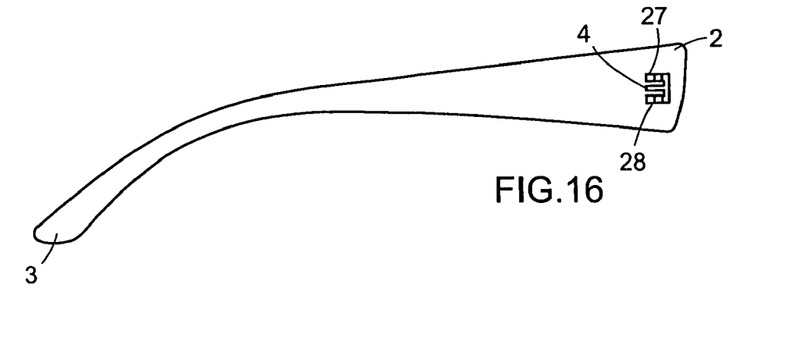
FIG. 16 illustrates the complete temple of FIG. 13 from the other side, i.e., showing the outer side of the temple.
Figure 17:
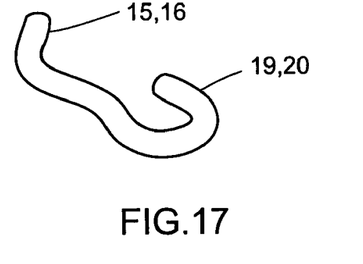
FIG. 17 shows a perspective view of the loop shape of a jaw for the preferred embodiment of FIG. 13.

FIG. 13 illustrates a perspective view of the hinge region a further preferred embodiment looking towards the inner side of the temple 1. A T-shaped slot 4 is provided with upper and lower arcuate guides 29, 30 extending adjacent the upper and lower surfaces 8, 9 of the slot 4 on the inner side of the temple 1. Shorter arcuate guides 31, 32 extend adjacent the edges of the wider middle portion 5 to define a pair of deep channels for the jaws 15, 16. The lines of contact in this embodiment extend as a partial loop, from the slot 4, around the curved engagement surface on the outer side of the temple 1, through the additional aperture 27, 28 and around a portion of the curved surface provided on the inner side of the temple 1. A recess 33, 34 also extends from the slot 4 to the front end 2 on the inner side of the temple 1 to accommodate a portion of each of the jaws 15, 16 between the hinged connection and the frontal portion 10. In addition to improving the appearance of this area, it also provides additional stiffness to the hinged connection when the temples are in an open configuration. FIGS. 14, 15 and 16 show a plan view, a side elevation (from the inner side) and a further side elevation (from the outer side), respectively, for the temple illustrated in FIG. 13. The hook shape of a jaw 15, 16 is shown in more detail in the perspective view of FIG. 17.

Figure 18:
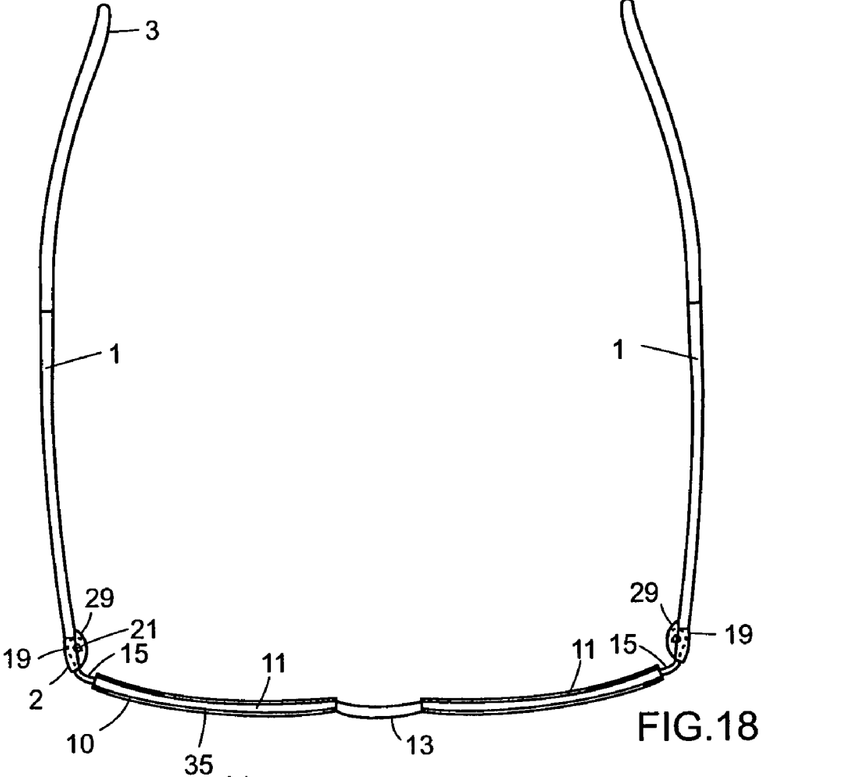
FIG. 18 shows a plan view of a pair of spectacles with the lenses fitted.
Figure 19:
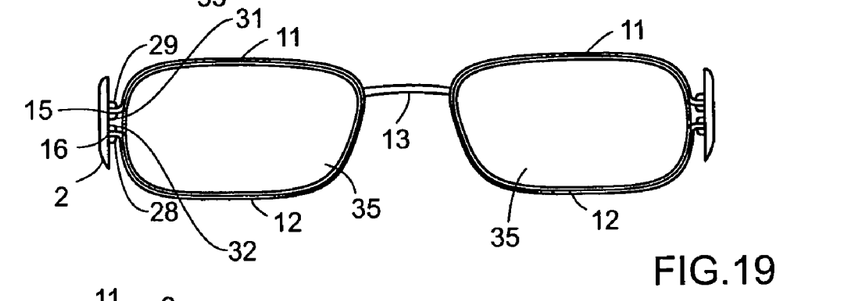
FIG. 19 illustrates the spectacles as a front elevation.
Figure 20:
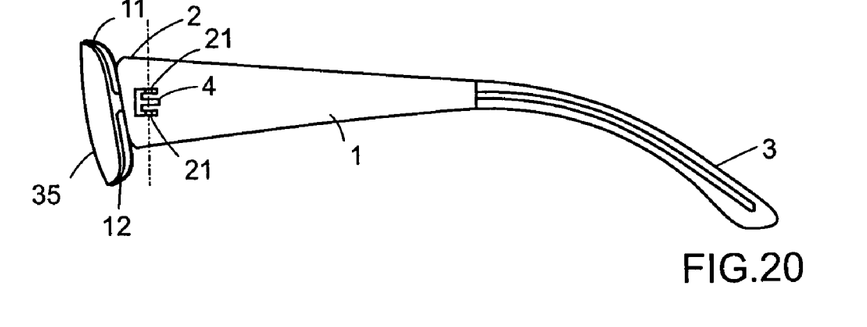
FIG. 20 shows a side elevation of the pair of spectacles of FIG. 18.

FIG. 18 shows a plan view of an assembled pair of spectacles with the lenses 35 in place to create the hinged connection. FIG. 19 shows a front elevation of the assembled spectacles and FIG. 20 shows a side elevation, respectively.

Figure 21:
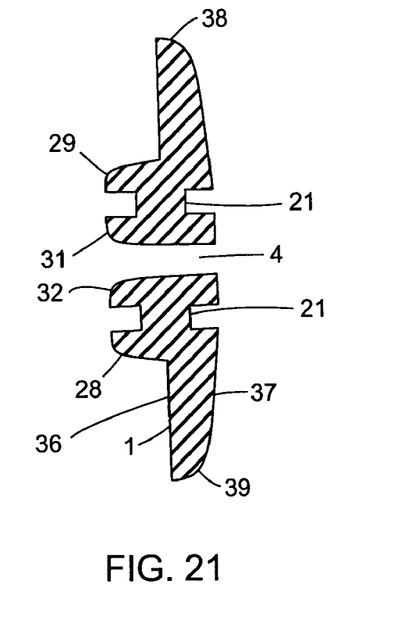
FIG. 21 shows a cross-sectional elevation through the temple of FIG. 15 along line A-A.
Figure 22:
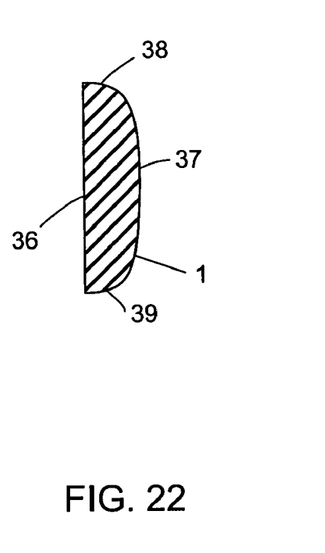
FIG. 22 shows a cross-sectional elevation through the temple of FIG. 15 along line B-B.

FIG. 21 shows a cross-sectional elevation through the hinge of FIG. 15 along line A-A. When the upper jaw 15 is in place, the hook portion 19 sits between upper arcuate guide 29 and the shorter arcuate guide 31, around the curved surface of the cylindrical member 21 forming the fulcrum of the hinge. The hook portion 20 of the lower jaw 16 sits between the lower arcuate guide 28 and the shorter arcuate guide 32. The line of frictional contact where the hooks engage the fulcrum 21 in each case is in a plane which is substantially at right angles to the pivot axis which passes down through the fulcrum. As shown, the inner side 36 of the temple may be planar whilst the outer side 37 may be curved, the inner side 36 and outer side 37 being joined along their top and bottom by upper and lower edges 38, 39, respectively. Also visible in the cross-section is that the opening to the slot 4 on the inner side 36 of the temple 1 may be curved to help facilitate insertion of the jaws 15, 16 into the slot 4 (the at least one aperture). FIG. 22 illustrates a cross-section through the temple 1 along line B-B in FIG. 15, further down the temple towards the halfway position. The temple 1 has an elongate cross-section which is substantially rectangular in shape with the outer side 37 rounded to provide overall a D-shaped cross-section.

Figure 23:
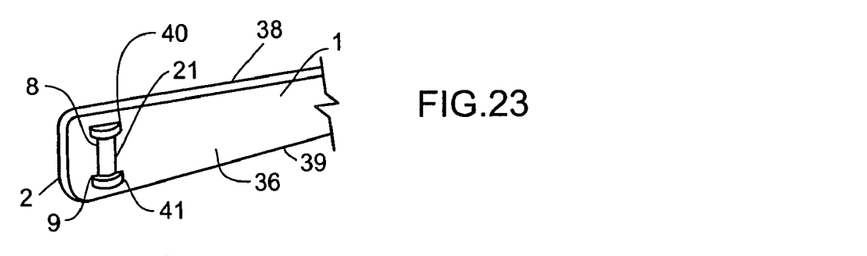
FIG. 23 shows an enlargement of features of the hinge for a further embodiment.
Figure 24:
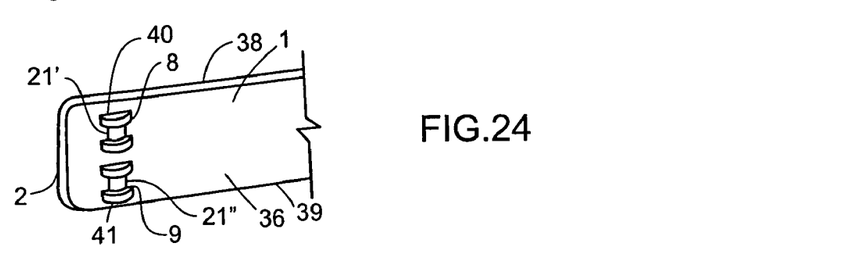
FIG. 24 shows an enlargement of features of the hinge for another embodiment.
Figure 25:
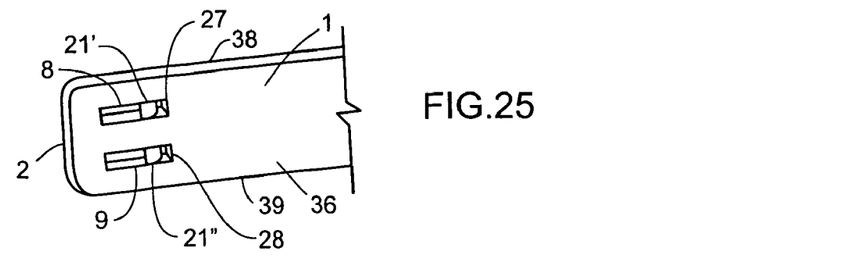
FIG. 25 shows an enlargement of features of the hinge for yet another embodiment.

FIGS. 23, 24 and 25 illustrate the hinge features of further embodiments. In FIG. 23, a cylindrical member 21 is mounted between upper and lower webs 40, 41 which project from the inner side 36 of the temple 1. The jaws 15, 16 are provided with hook portions 19, 20, as with the embodiment of FIG. 13, which are intended to hook around the curved surface of the cylindrical member 21. The slot 4 is provided by the opposed faces of the inner side 36, the inside of the cylindrical member 21 and the adjoining regions of the upper and lower webs 40, 41. The upper and lower jaws 15, 16 are biased against the upper and lower surfaces 8, 9 of the slot 4 when a lens is fitted between the upper and lower frame members 11, 12 of the frontal portion 10. FIG. 24 shows a similar embodiment where the cylindrical member 21 is divided into two sections 21', 21", one for each of the upper and lower jaws 15, 16. FIG. 25 illustrates a further variant, where in place of the upper and lower webs 40, 41 and cylindrical member 21, four apertures 4', 4", 27, 28 are provided. The two apertures 4', 4" closest to the front end 2 are elongate in the longitudinal direction of the temple 1 in order to facilitate feeding through of the hook portions 19, 20. In line with these slots 4', 4" are provided apertures 27, 28 to allow the ends of the jaws 15, 16 to be fed back through the temple from the outer side 37 to the inner side 36, in order to hook around a connecting cylindrical element 21' and 21" which provides the fulcrum for the hinge.

Thus a new hinge arrangement for a spectacles frame has been described requiring a new type of temple 1 to be formed, for example, from moulded plastics. As can be seen, for example, from at least FIGS. 3, 7, 8, 9, 10, 12, 13 to 16, 18 to 21 and 25, the present invention may provide in one embodiment a temple for a spectacles frame having a hinge portion for forming a hinged connection with a connecting part of a spectacles frame, the hinge portion providing a hinge axis for the hinged connection, wherein the hinge portion of the temple is provided with an elongate slot extending substantially parallel to the hinge axis, the elongate slot providing upper and lower surfaces for engagement with the connecting part, the hinge portion being provided with two further apertures, both located spaced from the upper and lower surfaces of the elongate slot in a direction which is substantially perpendicular to the hinge axis, the regions of the temple separating the elongate slot from the two further apertures are each provided with a curved surface to act as a fulcrum for upper and lower portions of the hinged connection, wherein the elongate slot is provided with a wider slot section in an area of the temple extending between the two further apertures for receiving the connecting part of the spectacles frame.

The invention claimed is:

1. A spectacles frame having a temple which is adapted to be hingedly connected to upper and lower prongs extending from a frontal portion of the frame, the frontal portion of the frame comprising upper and lower frame members which are arranged to extend from a bridge to the prongs around upper and lower peripheries of a lens for clamping a lens, once fitted, therebetween, wherein the prongs comprise a resilient member and extend from the frontal portion of the frame to engage with an aperture provided in the temple in order to create the hinged connection with the temple, the hinged connection providing a hinge axis for the temple to hinge with respect to the frontal portion and being configured so that when a lens is fitted, the prongs are biased against opposed upper and lower surfaces of the aperture thereby generating a clamping force which urges the upper and lower frame members against the lens for retaining the lens in the frontal portion of the frame, wherein the temple extends lengthwise with an elongate cross-section to define an inner side and an outer side of the temple, the sides extending between upper and lower edges of the temple, with the aperture extending through the temple in a thickness direction and including a wider section spaced from the upper and lower surfaces for facilitating the insertion of the upper and lower prongs, and wherein each prong engages the temple beyond the aperture in order to impart stiffness to the hinged connection.

2. The frame as claimed in claim 1, wherein the each prong traces a locus of contact with the temple creating a line of frictional contact which lies in a plane extending substantially perpendicular to the hinge axis.

3. The frame as claimed in claim 2, wherein the line of frictional contact for each prong comprises a portion of a loop which extends in said plane.

4. The frame as claimed in claim 1, wherein the aperture is in the form of a slot.

5. The frame as claimed in claim 4, wherein the aperture is in the form of a T-shaped slot.

6. The frame as claimed in claim 5, wherein the wider section of the slot is located in the middle of the slot.

7. The frame as claimed in claim 4, wherein the wider section of the slot is located in the middle of the slot.

8. The frame as claimed in claim 1, wherein temple is molded from plastics.

9. The frame as claimed in claim 1, wherein the upper and lower prongs extend from the frontal portion of the frame in a substantially parallel configuration with the upper prong arranged to be biased against the upper surface of the aperture and the lower prong arranged to be biased against the lower surface of the aperture.

10. The frame as claimed in claim 1, wherein the lower frame member comprises a resilient wire which extends from the frontal portion of the frame to form the lower prong.

11. The frame as claimed in claim 1, wherein the upper frame member comprises a resilient wire which extends from the frontal portion of the frame to form the upper prong.

12. The frame as claimed in claim 1, wherein the prongs are provided with hook portions and the temple includes curved tracks for the hook portions to grip and slide around when the hinge is operated.

13. The frame as claimed in claim 12, wherein the prongs each pass through an additional aperture to contact the inner side of the temple.

14. The frame as claimed in claim 13, wherein a pair of recesses extend from the aperture to a front end of the temple on the inner side of the temple to accommodate a portion of each of the prongs between the hinged connection and the frontal portion of the frame.

15. The frame as claimed in claim 1 having an insert in the temple providing a surface which the prongs engage against during a hinging operation.

16. A spectacles frame having a temple which is adapted to be hingedly connected to upper and lower prongs extending from a frontal portion of the frame, the frontal portion of the frame comprising upper and lower frame members which are arranged to extend from a bridge to the prongs around upper and lower peripheries of a lens for clamping a lens, once fitted, therebetween, wherein the prongs comprise a resilient member and extend from the frontal portion of the frame to engage with an aperture provided in the temple in order to create the hinged connection with the temple, the hinged connection providing a hinge axis for the temple to hinge with respect to the frontal portion and being configured so that when a lens is fitted, the upper prong is biased against an upper surface of a first aperture and the lower prong is biased against an opposed lower, surface of a second aperture thereby generating a clamping force which urges the upper and lower frame members against the lens for retaining the lens in the frontal portion of the frame, wherein the temple extends lengthwise with an elongate cross-section to define an inner side and an outer side of the temple, the sides extending between upper and lower edges of the temple, with the first and second apertures extending through the temple in a thickness direction and each including a section of wider profile, spaced from the upper and lower surfaces, for facilitating the insertion of the upper or lower prong, and wherein each prong engages the temple beyond the first or second aperture in order to impart stiffness to the hinged connection.

17. The frame as claimed in claim 16, wherein each prong traces a locus of contact with the temple to provide a line of frictional contact which lies in a plane extending substantially perpendicular to the hinge axis.

18. The frame as claimed in claim 17, wherein the line of frictional contact for each prong comprises a portion of a loop which extends in said plane.

19. The frame as claimed in claim 16, wherein the first and second apertures are each in the form of a slot.

20. The frame as claimed in claim 19, wherein the first and second apertures are each in the form of a L-shaped slot.

21. The frame as claimed in claim 16, wherein the temple is molded from plastics.

22. The frame as claimed in claim 16, wherein the upper and lower prongs extend in a substantially parallel configuration with the upper prong arranged to be biased against the upper surface of the first aperture and the lower prong arranged to be biased against the lower surface of the second aperture, the first aperture being positioned above and aligned with the second aperture.

23. The frame as claimed claim 16, wherein the lower frame member comprises a resilient wire which extends from the frontal portion of the frame to form the lower prong.

24. The frame as claimed in claim 16, wherein the upper frame member comprises a resilient wire which extends from the frontal portion of the frame to form the upper prong.

25. The frame as claimed in claim 16, wherein the prongs are provided with hook portions and the temple includes curved tracks for the hook portions to grip and slide around when the hinge is operated.

26. The frame as claimed in claim 16, having an insert in the temple providing a surface which the prongs engage against during a hinging operation.

27. A temple for a spectacles frame having a hinge portion for forming a hinged connection with a connecting part of a spectacles frame, the hinge portion providing a hinge axis for the hinged connection, wherein the hinge portion of the temple is provided with an elongate slot extending substantially parallel to the hinge axis, the elongate slot providing upper and lower surfaces for engagement with the connecting part, the hinge portion being provided with two further apertures, both located spaced from the upper and lower surfaces of the elongate slot in a direction which is substantially perpendicular to the hinge axis, the regions of the temple separating the elongate slot from the two further apertures are each provided with a curved surface to act as a fulcrum for upper and lower portions of the hinged connection, wherein the elongate slot is provided with a wider slot section in an area of the temple extending between the two further apertures for receiving the connecting part of the spectacles frame.

* * * * *